United States Patent
Barret et al.

(10) Patent No.: US 10,576,939 B2
(45) Date of Patent: Mar. 3, 2020

(54) METHOD FOR RECOVERING RAINWATER AT THE SURFACE OF A VEHICLE, RECOVERY CIRCUIT AND VEHICLE EQUIPPED WITH SUCH A CIRCUIT

(71) Applicant: Valeo Systèmes d'Essuyage, Le Mesnil Saint Denis (FR)

(72) Inventors: Guillaume Barret, Issoire (FR); Christophe Erkiet, Issoire (FR); Severin Doupeux, Issoire (FR); Matthieu Combeau, Issoire (FR); Olivier Jomard, Issoire (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 0 days.

(21) Appl. No.: 15/886,267

(22) Filed: Feb. 1, 2018

(65) Prior Publication Data
US 2018/0215352 A1    Aug. 2, 2018

(30) Foreign Application Priority Data
Feb. 2, 2017    (FR) ...................................... 17 50891

(51) Int. Cl.
*B60S 1/50* (2006.01)
*B60H 1/00* (2006.01)
(Continued)

(52) U.S. Cl.
CPC ............ *B60S 1/50* (2013.01); *B60H 1/00507* (2013.01); *B60R 16/08* (2013.01); *B62D 25/081* (2013.01); *G01F 13/00* (2013.01); *G05D 9/12* (2013.01)

(58) Field of Classification Search
CPC ....... B60R 16/08; B62D 25/081; G01F 13/00; G05D 9/12; B60S 1/50; B60H 1/00507
See application file for complete search history.

(56) References Cited

U.S. PATENT DOCUMENTS 2,770,017 A * 11/1956 Oishei .................. B60S 1/48
                                                    15/250.27
5,261,254 A * 11/1993 Cattane .................. B60H 3/024
                                                    15/250.1
(Continued)

FOREIGN PATENT DOCUMENTS

DE    19858635 A1    6/2000
DE    10138466 A1    4/2003
(Continued)

OTHER PUBLICATIONS

Preliminary Search Report and Written Opinion issued in corresponding French Application No. FR1750891, dated Jan. 12, 2018 (6 pages).

*Primary Examiner* — Nathaniel T Woodward
(74) *Attorney, Agent, or Firm* — Osha Liang LLP

(57) ABSTRACT

The invention proposes a method for recovering a liquid collected on an interior or exterior surface (1, 19) of a motor vehicle bodywork (17) or glazing (2) element, characterized in that it consists in analysing a quantity of the collected liquid stream using a device (30) for measuring or estimating a parameter indicative of a state of pollution of the collected liquid, such as its turbidity, in comparing a measured value of the turbidity against a threshold value and, when the measured value is below the threshold value, in directing the collected liquid stream towards a recovery unit (9) or, when the measured value is above the threshold value, in discharging the collected liquid stream, for example in the form of waste.

17 Claims, 3 Drawing Sheets

(51) Int. Cl.
  B60R 16/08  (2006.01)
  B62D 25/08  (2006.01)
  G01F 13/00  (2006.01)
  G05D 9/12   (2006.01)

(56) References Cited

U.S. PATENT DOCUMENTS

| | | | | |
|---|---|---|---|---|
| 5,561,882 | A  * | 10/1996 | Eustache | B60H 1/28 |
| | | | | 15/250.001 |
| 5,946,763 | A  * | 9/1999 | Egner-Walter | B60H 3/0658 |
| | | | | 15/250.02 |
| 6,024,803 | A  * | 2/2000 | Buchanan, Jr. | B60S 1/50 |
| | | | | 134/123 |
| 6,266,842 | B1 * | 7/2001 | Muller | B60S 1/481 |
| | | | | 15/250.01 |
| 7,845,362 | B2 * | 12/2010 | Morris | H01M 8/06 |
| | | | | 134/123 |
| 9,000,000 | B2 * | 4/2015 | Carroll | B60S 1/48 |
| | | | | 210/95 |
| 9,434,356 | B1 * | 9/2016 | Puente Fernandez | B60S 1/50 |
| 9,855,924 | B2 * | 1/2018 | Quintero Perez | B60L 1/003 |
| 2007/0084228 | A1 * | 4/2007 | Heck | B60H 1/3233 |
| | | | | 62/285 |
| 2013/0206266 | A1 * | 8/2013 | Stenhouse | B60S 1/50 |
| | | | | 137/899.4 |
| 2016/0332601 | A1 * | 11/2016 | Carroll | B60S 1/50 |
| 2017/0028967 | A1 * | 2/2017 | Caillot | B60S 1/488 |
| 2019/0039576 | A1 * | 2/2019 | Ansaldi | B60S 1/481 |

FOREIGN PATENT DOCUMENTS

| | | |
|---|---|---|
| DE | 102008029254 A1 | 12/2009 |
| WO | 2014/116141 A1 | 7/2014 |

* cited by examiner

METHOD FOR RECOVERING RAINWATER AT THE SURFACE OF A VEHICLE, RECOVERY CIRCUIT AND VEHICLE EQUIPPED WITH SUCH A CIRCUIT

TECHNICAL FIELD OF THE INVENTION

The invention relates to the recovery of the liquids present on the surfaces, notably the exterior surfaces, of a motor vehicle.

BACKGROUND OF THE INVENTION

The invention relates for example to the recovery of rainwater or of condensation present on the bodywork or on the windscreen, or alternatively of the liquid sprayed beforehand onto these surfaces in order to wash or clean them, such as, for example, washer fluid.

Numerous designs of arrangements or devices for collecting these liquids that it is desirable to recover, notably so that they can be reused in various ways on board the vehicle, are known.

Thus it is possible to envisage reusing the water collected in the case of rain falling on the surface of the roof or top of the vehicle for various washing equipment or for equipment the purpose of which is to regulate temperature or humidity.

It is notably beneficial and desirable to recover water so that it can be "reinjected" into a washer system associated with a windscreen wiper system, for example in order to maintain the clearest possible visibility through the windscreen.

Such a collected liquid contains a greater or lesser amount of foreign bodies, and notably impurities and polluting particles.

In order to be able to reuse it effectively, it is necessary for the quantity of recovered liquid that is to be reused to exhibit sufficient "cleanliness" properties in order also to avoid damaging the systems concerned, such as the washer systems.

Thus, it has already been proposed for the collected water to be filtered before it is reintroduced into a washer fluid reservoir.

It is possible to obtain different qualities or levels of purity by multiplying filters with different characteristics.

Reference may, for example, be made to the content of documents WO-A-2014/11614 or DE-A-102008029254.

The filters or filtration systems used are bulky and heavy and also need to be changed and/or serviced.

BRIEF SUMMARY OF THE INVENTION

In order in particular to overcome these disadvantages, the invention proposes an economical recovery method seeking to employ a principle of sorting or selecting the collected liquid.

The invention proposes a method for recovering a liquid collected on an interior or exterior surface of a motor vehicle bodywork or glazing element, characterized in that it consists:

a) in analysing a quantity of the collected liquid stream using a device for measuring or estimating a parameter indicative of a state of pollution of the collected liquid so as to provide a measured or estimated value of the level of pollution of the liquid;

b) in comparing the said measured or estimated value against at least one threshold value for the level of pollution of the liquid;

c) and, when the measured or estimated value is below the said threshold value, in directing at least part of the collected liquid stream towards a collected-liquid recovery unit.

Thus, after having analysed and evaluated the quality of the collected liquid, a decision is made as to whether or not to recover the liquid for the purpose of reusing it.

All the quantities of collected liquid that do not conform to the desired quality threshold are discharged in the form of waste, for example of wastewater which may, for example, be discharged directly into the environment (from where they were previously collected).

According to other features of the method:
the method consists in repeating comparison step b) and, when the measured or estimated value is above the said threshold value, d) in interrupting the said directing and in discharging the collected liquid stream;
the parameter indicative of the state of pollution of the collected liquid is its turbidity;
step a) consists in circulating a quantity of the collected liquid stream past the measurement or estimation device;
step a) consists in storing at least part of the collected liquid stream in an intermediate collecting reservoir equipped with the measurement or estimation device;
the method consists in performing step b) according to a collected-water level;
step b) is triggered with a time delay with respect to measurement step a);
step d) is triggered immediately after a measured or estimated value above the said threshold value is detected;
the said recovery unit is a usage unit or a storage unit that respectively uses or stores the collected liquid.

The invention also proposes a circuit for recovering a liquid collected on an interior or exterior surface of a motor vehicle bodywork or glazing element, characterized in that it comprises:

a measurement zone equipped with a device for measuring or estimating a parameter indicative of the state of pollution of the collected liquid so as to supply a measured or estimated value of the level of pollution of the liquid;
an outlet pipe connected to the said measurement zone;
a commanded device which is connected to the said outlet pipe and which, according to the said measured or estimated value of the level of pollution of the collected liquid, authorizes or interrupts the circulation of the collected liquid stream towards a collected-liquid recovery unit.

According to other features of the circuit:
the said device is a commanded solenoid valve;
the solenoid valve is commanded by an electromagnet and a return spring towards a stable discharge position;
the measurement or estimation device is a sensor for measuring the turbidity of the collected liquid;
the measurement zone is a portion of pipe through which at least part of the collected liquid stream circulates;
the measurement zone is an intermediate reservoir for collecting at least part of the collected liquid stream;
the circuit comprises means for timing the change in state of the solenoid valve for authorizing the circulation of the collected liquid stream towards a collected-liquid recovery unit;
the recovery unit is a usage unit or a storage unit respectively using or storing the collected liquid.

The invention also proposes a motor vehicle, characterized in that it is equipped with means for collecting a liquid on an interior or exterior surface of a bodywork or glazing element of the vehicle, and with a recovery circuit according to the invention.

According to other features of the vehicle:
it comprises at least one system for wiping the exterior surface of a window of the vehicle, and the said collected-liquid recovery unit comprises a washer-fluid storage unit associated with the said wiper system;
it comprises at least one thermal circuit for the heating or cooling of the vehicle interior or of an engine (for example combustion engine) with which the vehicle is equipped or of an accessory or item of equipment with which the vehicle is equipped, and the said recovery unit is a unit that stores liquid fed to the said thermal circuit.

BRIEF DESCRIPTION OF THE FIGURES

Further features and advantages of the invention will become apparent during the reading of the detailed description which follows, for an understanding of which reference will be made to the attached drawings in which.

DETAILED DESCRIPTION OF THE FIGURES

In the remainder of the description, elements exhibiting an identical structure or similar functions will be denoted by the same references.

Figure 3:
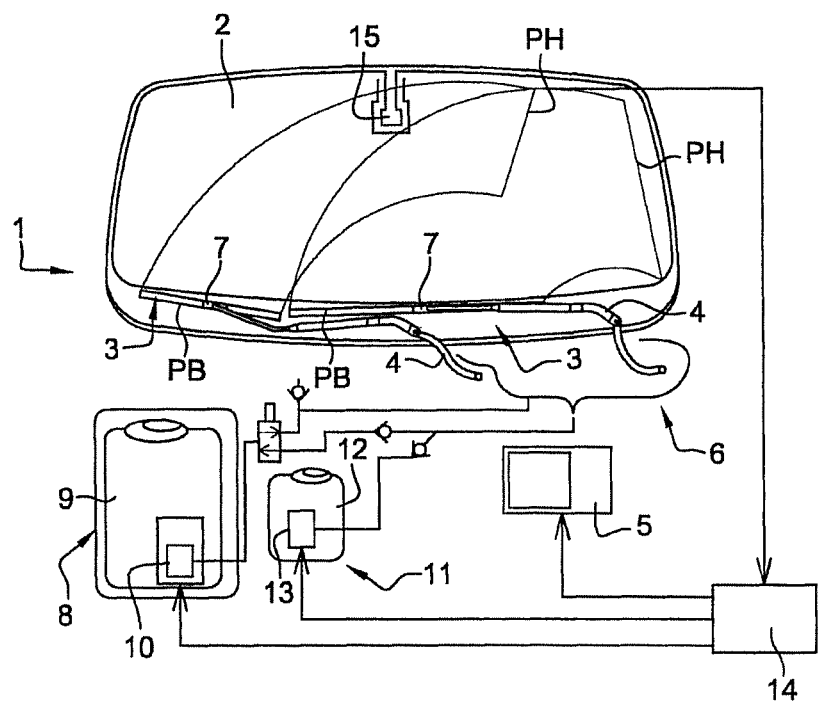
FIG. 3 is a schematic view of a system for wiping and cleaning a window, in this instance a windscreen of a motor vehicle.

By way of nonlimiting example, the invention relates to the recovery of liquid and, for example, of rainwater that can be reused for the operation of a system 100 for cleaning the exterior surface 1 of a window of a motor vehicle, which in this instance is a windscreen 2, as illustrated in FIG. 3.

The system comprises a cleaning device which here comprises two windscreen wipers, or wipers 3, each of which is mounted on an associated wiper arm 4.

Each wiper is designed to move angularly over the exterior surface 1 of the windscreen 2 between an extreme bottom wiping position PB and an extreme top wiping position PH, and vice versa.

During these wiping movements, the wiper blades with which the wipers 3 are equipped "wipe" the rain present on the exterior surface of the windscreen and are able to move this water to the bottom and/or sides of the windscreen where it can, in a known way, be collected for potential reuse, as can rainwater collected on the exterior surface of the roof of the vehicle (not depicted).

The cleaning device also comprises an electric motor 5 which is intended to drive the wiper arms, and therefore the wipers 3 in their alternating back and forth angular motion.

The cleaning system also comprises a set of means for spraying liquid onto the exterior surface of the windscreen.

These means here comprise a system 6 of pipe(s) which is connected to spray nozzles (or nozzles) 7 intended to eject and spray liquid onto the windscreen 2.

The system of pipe(s) 6 is, here, fed with liquid that is to be sprayed, by two distinct upstream circuits each of which is associated with a specific function demanded of the cleaning system.

For a normal or conventional washing function aimed at eliminating water present on the exterior surface of the windscreen, a first circuit 8 comprises a first reservoir 9—containing a washer fluid—and a first pump 10 intended to circulate the washer fluid through the system of pipe(s) 6.

For a cleaning function such as a deicing function, a second circuit 11 comprises a second reservoir 12—containing a deicing liquid—and a second pump 13 intended to circulate the deicing liquid through the system of pipe(s) 6.

Such a deicing function is used to remove ice formed on the exterior surface of the window, in this instance of the windscreen.

By comparison with a normal or conventional washing function, the deicing function has the particular feature of ridding the windscreen of a substance sticking to the exterior surface 1 of the windscreen 2, for which the liquid used for the washing function is unsuitable.

The wiping and cleaning system comprises an electronic unit 14 capable of commanding the electric motor 5 that drives the wipers 3 and activates the pumps 21, 22 of the two liquid supply circuits 8, 11 in order to cause the system to execute various operating cycles, including cycles suited either to the normal washing function, using the washer fluid present in the first reservoir 11, or to the deicing function using the special-purpose liquid contained in the second reservoir 12.

The electronic control unit 14 may vary in its complexity depending on the complexity of the operations planned for executing the various cycles and performing the various functions.

Furthermore, the vehicle may be equipped with a sensor 15 for measuring the exterior temperature, which is here situated on a top part of the windscreen 2. The electronic control unit 14 may be connected to the exterior temperature measurement sensor 15 and exploit data supplied by this sensor to adapt parameters of the various cycles and perform the various functions executed by the system.

The recovery of liquid, and for example of rainwater, as proposed by the invention seeks for example to be able to use the recovered water as washing or rinsing water used in the first reservoir 9, as-is and/or mixed with suitable additives.

Figure 1:
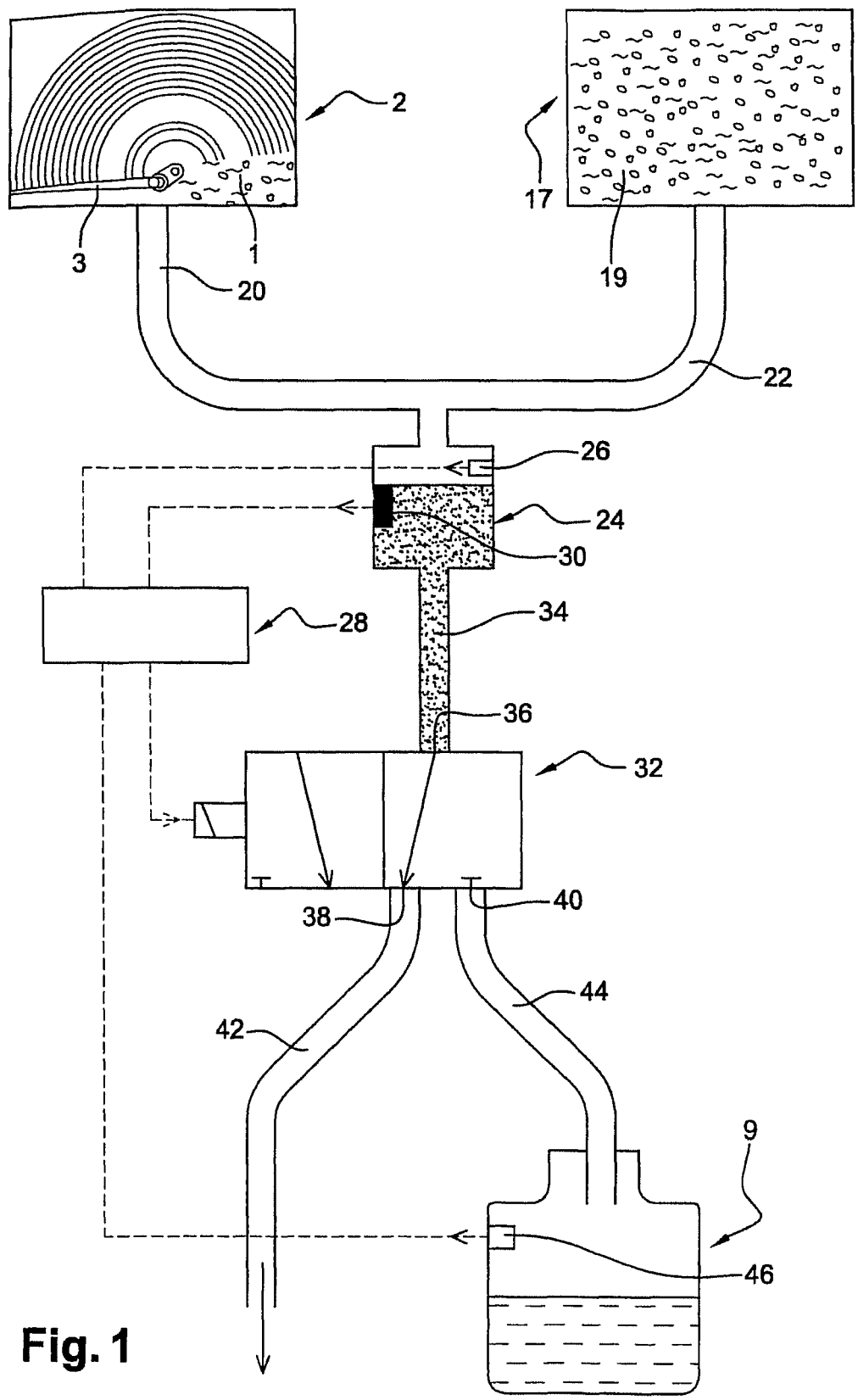
FIG. 1 schematically illustrates a system for collecting liquid on exterior surfaces of a motor vehicle, which is associated with a first embodiment of a recovery circuit according to the invention.

FIG. 1, in the top-left-hand part, depicts a windscreen 2 the exterior surface 1 of which is swept by a wiper 3 and a first collecting pipe 20 through which the water collected by wiping and which is gathered at the bottom part of the windscreen 2 flows, for example by gravity.

The top-right-hand part schematically depicts a portion of the vehicle bodywork 17 which is, for example, a portion of the roof, on the exterior surface of which the rain is collected and then gathered towards a second collecting pipe 22.

The two collecting pipes 20 and 22 here feed into a reservoir 24 for collecting water that is to be recovered.

The collecting reservoir 24 is equipped with a level sensor 26 which transmits signals indicative of the quantity of liquid contained in the collecting reservoir 24 to electronic control and analysis means such as an Electronic Control Unit (ECU) 28 depicted schematically in FIG. 1.

The collecting reservoir 24 is also equipped with a sensor 30 for measuring the turbidity of the water contained in the collecting reservoir 24.

The turbidity sensor emits signals indicative of the turbidity of the liquid and bound for the ECU 28.

In a known way, a turbidity sensor evaluates the quality of the water by measuring its level of turbidity. It is capable of detecting particles in suspension in the water by measuring the transmission of light and the amount which is scattered with the movement of the quantity of solids in suspension in the water. If the quantity of solids in suspension in the water increases, the turbidity level or value of the liquid increases.

The turbidity denotes the content, within a fluid, and notably within a liquid, of matter that makes it cloudy. The suspended matter is defined as being all of the particulate material entrained passively into the water. The turbidity corresponds to the optical property of the water that means that incident light is scattered or absorbed. It is a parameter the significance of which is dependent on the measurement technique used. There are several optical measurements that can take account of the turbidity.

A turbidity sensor may have various signal output modes: analogue and/or digital.

It is possible for example to use a digital turbidity sensor the threshold of which can be adjusted in digital signal mode.

The ECU 28 may also be designed to convert an analogue signal indicative of the turbidity and supplied by the turbidity sensor 30 into a digital signal.

Here, towards the bottom, the collecting reservoir 24 is connected to an electrohydraulic solenoid valve 32 by an outlet pipe 34.

The solenoid valve 32 here is of the three-way two-position type, with one inlet 36 and two outlets 38 and 40.

The connecting pipe 34 is connected to the inlet 36, while the first outlet is connected to a pipe 42 referred to as a discharge pipe and the second outlet is connected to a pipe 44 referred to as the recovery pipe.

The solenoid valve 32 is illustrated in its stable rest position in which the inlet 36 communicates with the first outlet 38, namely in which the outlet pipe 34 is connected to the discharge pipe 42.

The solenoid valve is connected to the ECU 28 which may command it to change position from its stable rest position to its second position (not depicted) in which the inlet 36 communicates with the second outlet 40, namely in which the outlet pipe 34 is connected to the recovery pipe 44.

According to an alternative form which has not been depicted, the solenoid valve 32 may be of the three-way, three-position type, with the same arrangement for the ways, but with a third position in which neither of the two outlets 38 or 40 is connected to the inlet 36, namely a third position in which the outlet pipe is "closed" and no collected liquid flows from the collecting reservoir 24 through the solenoid valve 32.

The flows and circulation of liquid are described and illustrated as being achieved by gravity.

Without departing from the scope of the invention, they may notably be achieved using pumps or suitable circulators commanded by the ECU 28.

The recovery pipe 44 opens at the downstream end into the first reservoir 9 so that the recovered water can be used as washing or rinsing water, as-is and/or mixed with suitable additives.

Like the collecting reservoir 24, the reservoir 9, which can be filled with recovered water, can be equipped with a level sensor 46 which transmits signals indicative of the quantity of liquid contained in the reservoir 9 to the ECU 28.

The invention is not restricted to the use of an intermediate collecting reservoir 24 as described.

As an alternative, it is possible to connect a collecting source directly to the outlet pipe 34, by providing the path between the collecting source and the solenoid valve 32 with the turbidity sensor 30.

The arrangement and the circuit which has just been described with reference to FIG. 1 allow implementation of a recovery method according to the invention.

The analysis of the water by the turbidity sensor 30 provides a parameter indicative of a state of pollution of the water in the form of a signal transmitted to the ECU 28, in which unit a comparison is made between the value supplied by the turbidity sensor 30 and a permissible threshold value for the level of pollution of the collected water with a view to its recovery as all or part of the washing fluid.

As long as the measured value of the level of pollution is below the threshold value stored or mapped in the ECU, the solenoid valve 32 is activated to direct the collected liquid stream towards the recovery pipe 44 and the reservoir 9.

The operation of comparing against the threshold value is repeated regularly (continuously or in a sequenced manner) so that as soon as the value measured by the turbidity sensor 30 passes above the said threshold value, the ECU interrupts the commanding of the solenoid valve 32 which returns to its stable position illustrated in FIG. 1 so as to discharge all of the collected water in the form of waste.

The use of a collecting reservoir 24 allows the temporary storage of the collected water, which is for example identified as being of good quality, notably when, for example, the reservoir 9 is "full" according to the information supplied by the sensor 46. This can be done by using a three-position solenoid valve as mentioned previously or using a circuit according to the second embodiment of FIG. 2.

In the same way, the potential storage of liquid in the collecting reservoir 24 is managed according to the fill level thereof as supplied by the level sensor 26.

In the event of overfill, the collected water, even if of good quality, may be discharged into an intermediate storage reservoir equipped with the measurement or estimation device.

Figure 2:
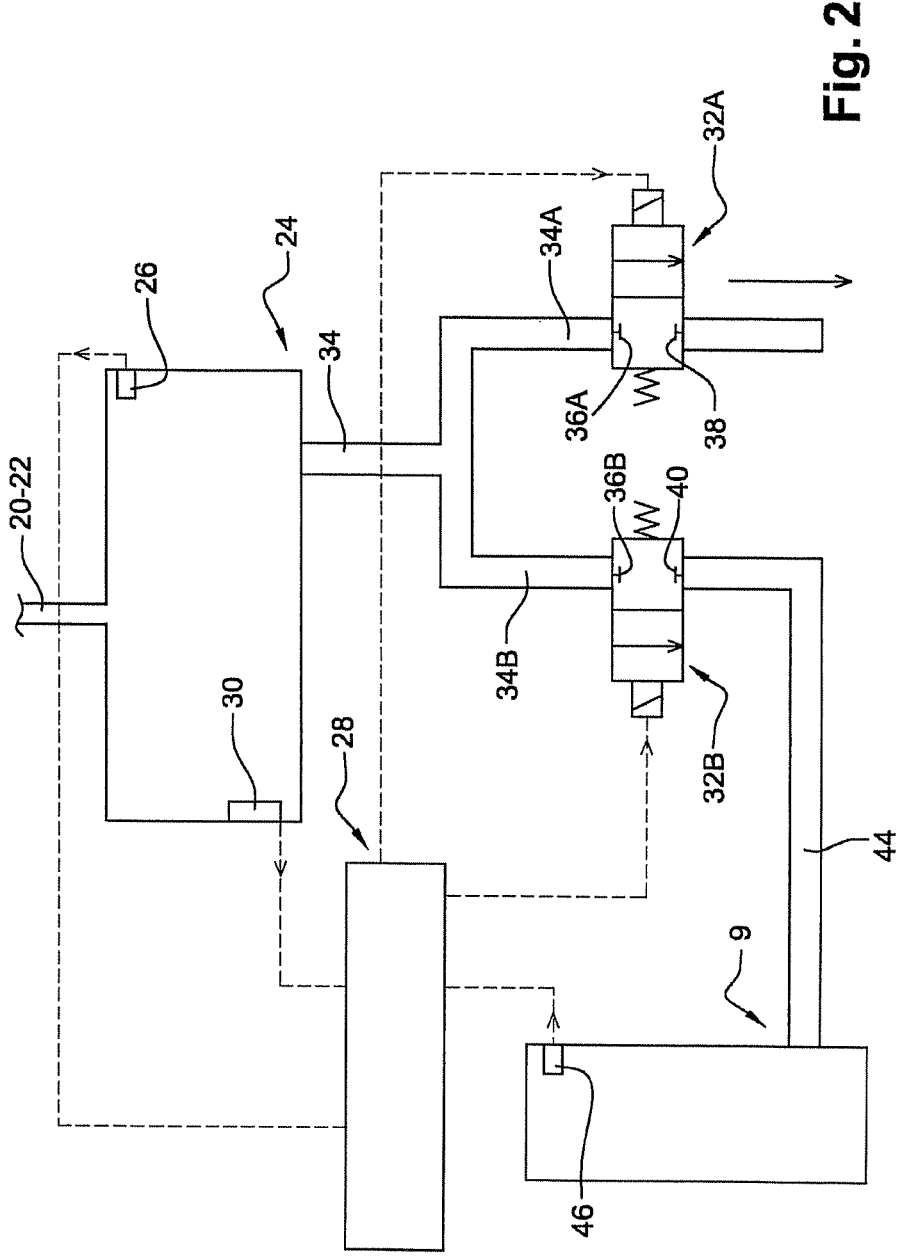
FIG. 2 schematically illustrates a second embodiment of a recovery circuit according to the invention.

According to the second embodiment illustrated in FIG. 2, the outlet pipe 34 splits into:
  a first outlet pipe 34A connected to the discharge pipe 42 through a first solenoid valve 32A; and
  a second outlet pipe 34B connected to the recovery pipe 44 through a second solenoid valve 32B.

Each of the two solenoid valves 32A and 32B is commanded by the ECU 28.

Each solenoid valve 32A, 32B here is of the two-way two-position type with one inlet 36A, 36B respectively connected to the associated outlet pipe 34A, 34B, and one outlet 40, 38 respectively connected, in the case of one of them, to the discharge pipe 42' and, in the case of the other, to the recovery pipe 44.

In its stable rest position, each solenoid valve 32A, 32B interrupts the communication between its inlet and its outlet and, therefore, respectively, between the outlet pipe 34A and the discharge pipe 42 on the one hand, and between the outlet pipe 34B and the recovery pipe 44 on the other.

Once again, it is not compulsory to use an intermediate collecting reservoir 24.

As before, the ECU is able to manage and command the various flows through the solenoid valves 32A and 32B to take account of the level of pollution/turbidity of the collected water and of the fill levels of the various reservoirs.

For certain applications, the pipe 44 referred to as the discharge pipe may be connected to treatment means such as filtration or pollution-control means so that this "polluted" liquid stream can be recycled and used downstream, possibly with some intermediate storage not depicted.

The invention claimed is:

1. A method for recovering a liquid passively collected on an interior or exterior surface of a motor vehicle bodywork or glazing element, the method comprising:
   a) analyzing a quantity of a passively collected liquid stream using a measurement or estimation device for measuring or estimating a parameter indicative of a state of pollution of the passively collected liquid so as to provide a measured or estimated value of the level of pollution of the liquid;
   b) comparing said measured or estimated value against at least one threshold value for the level of pollution of the liquid; and
   c) when the measured or estimated value is below said threshold value, directing at least part of the passively collected liquid stream towards a collected-liquid recovery unit,
   wherein step a) comprises storing at least part of the passively collected liquid stream in an intermediate collecting reservoir equipped with the measurement or estimation device,
   wherein the intermediate collecting reservoir is a tank for passively collecting liquid having a cross-section area that is greater than pipes directly upstream of the intermediate collecting reservoir.

2. The method according to claim 1, further comprising repeating comparison step b) and, when the measured or estimated value is above the threshold value, d) interrupting the directing and in discharging the collected liquid stream.

3. The method according to claim 2, wherein step d) is triggered immediately after a measured or estimated value above the threshold value is detected.

4. The method according to claim 1, wherein the parameter indicative of the state of pollution of the collected liquid is its turbidity.

5. The method according to claim 1, wherein step a) comprises circulating a quantity of the collected liquid stream past the measurement or estimation device.

6. The method according to claim 1, wherein step b) is performed according to a collected-water level.

7. The method according to claim 1, wherein step b) is triggered with a time delay with respect to measurement step a).

8. The method according to claim 1, wherein said recovery unit is a usage unit or a storage unit that respectively uses or stores the collected liquid.

9. A circuit for recovering a liquid passively collected on an interior or exterior surface of a motor vehicle bodywork or glazing element, the circuit comprising:
   a measurement zone equipped with a measurement or estimation device for measuring or estimating a parameter indicative of the state of pollution of the passively collected liquid so as to supply a measured or estimated value of the level of pollution of the liquid;
   an outlet pipe connected to the measurement zone; and
   a commanded device which is connected to the outlet pipe and which, according to the measured or estimated value of the level of pollution of the passively collected liquid, authorizes or interrupts the circulation of a passively collected liquid stream towards a collected-liquid recovery unit,
   wherein said measurement zone is an intermediate reservoir for collecting at least part of the passively collected liquid stream,
   wherein the intermediate collecting reservoir is a tank for passively collecting liquid having a cross-section area that is greater than pipes directly upstream of the intermediate collecting reservoir.

10. The circuit according to claim 9, wherein said commanded device is a commanded solenoid valve.

11. The circuit according to claim 10, wherein the solenoid valve is commanded by an electromagnet and a return spring towards a stable discharge position.

12. The circuit according to claim 10, wherein said recovery unit is a usage unit or a storage unit respectively using or storing the collected liquid.

13. The circuit according to claim 9, wherein said measurement or estimation device is a sensor for measuring the turbidity of the collected liquid.

14. The circuit according to claim 9, wherein said measurement zone is a portion of pipe through which at least part of the collected liquid stream circulates.

15. A motor vehicle equipped with means for collecting a liquid on an interior or exterior surface of a bodywork or glazing element of the vehicle, and with a recovery circuit according to claim 9.

16. The vehicle according to claim 15, further comprising at least one system for wiping the exterior surface of a window of the vehicle, and wherein said collected-liquid recovery unit comprises a washer-fluid storage unit associated with the wiper system.

17. The vehicle according to claim 15, further comprising at least one thermal circuit for the heating or cooling of the vehicle interior or of an engine with which the vehicle is equipped or of an accessory or item of equipment with which the vehicle is equipped, and wherein said recovery unit is a unit that stores liquid fed to the thermal circuit.

* * * * *